June 24, 1924.       L. BERRY       1,498,904
BURGLAR TRAP
Filed Sept. 18, 1923
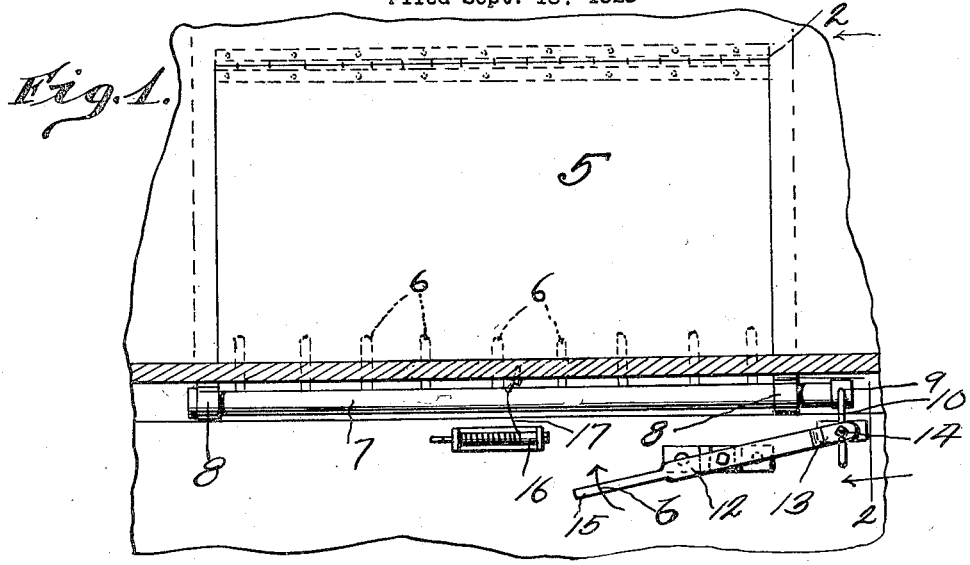
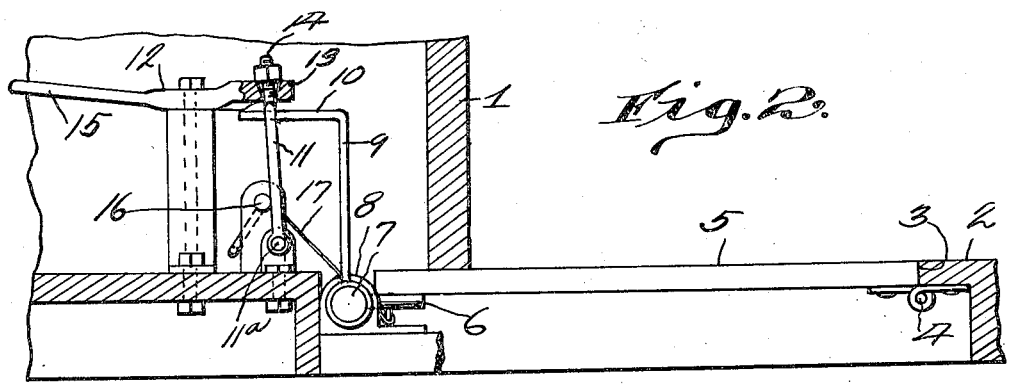
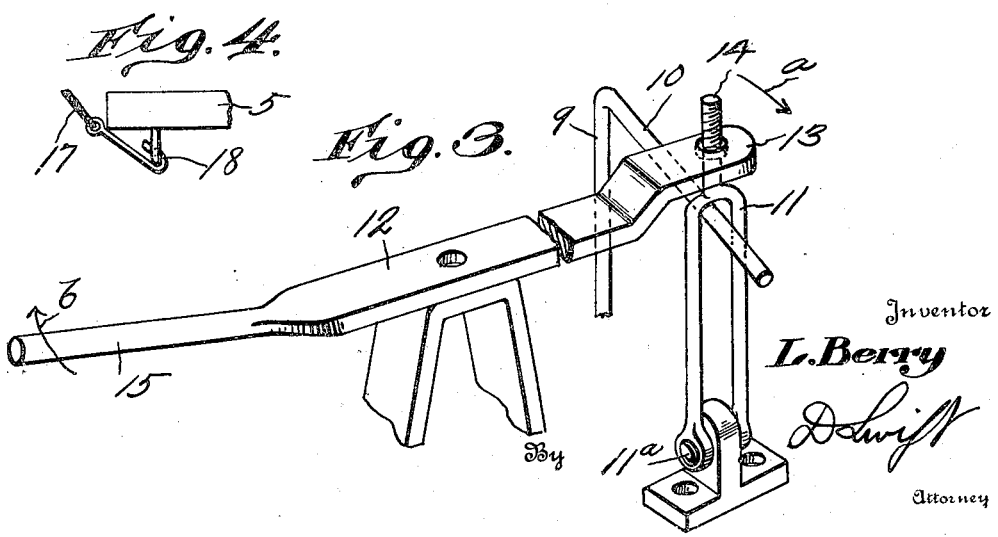
Inventor
L. Berry
By D. Swift
Attorney Patented June 24, 1924.

1,498,904

UNITED STATES PATENT OFFICE.

LEWIS BERRY, OF BUCHANAN, KENTUCKY.

BURGLAR TRAP.

Application filed September 18, 1923. Serial No. 663,408.

*To all whom it may concern:*

Be it known that I, LEWIS BERRY, a citizen of the United States, residing at Buchanan, in the county of Lawrence, State of Kentucky, have invented a new and useful Burglar Trap; and I do hereby declare the following to be a full, clear, and exact description of the invention, such as will enable others skilled in the art to which it appertains to make and use the same.

The invention relates to burglar traps, and has for its object to provide a device of this character comprising a trap door, disposed in the floor of a bank or the like adjacent a counter and provided with means for normally holding the door in closed position, and with means whereby a paying teller or other person behind the counter may release the door for allowing the burglar or robber to drop through the floor into the basement.

A further object is to provide a rockable shaft having a plurality of lugs adapted to engage under the free end of the trap door for holding the same in closed position. The shaft is provided with an arm which is engaged by a foot lever for holding the shaft against rotation until the foot lever is moved by the operator's foot.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a top plan view of the trap door, and its operating mechanism, showing a portion of a counter.

Figure 2 is a sectional view taken on line 2—2 of Figure 1.

Figure 3 is a perspective view of the foot lever and adjacent mechanism.

Figure 4 is a detail view showing the hook for raising the free end of the trap door after it has been stretched.

Referring to the drawing, the numeral 1 designates the vertical front wall of a counter, for instance the paying teller's counter in a bank, and 2 the floor. Hingedly mounted in the opening 3 of the floor at 4 is the trap door 5, the free end of which extends under the wall 1 of the counter and is held in engagement therewith and the door in horizontal position by means of lugs 6, which lugs engage under the free end of the door. Lugs 6 are carried by a rockable shaft 7, which shaft is rockably mounted in bearings 8 beneath the counter 1. When a person attempts to hold up the paying teller and rob the cage, the trap door 5 is released for allowing the thief to drop through the theft door opening 3 into the cellar or any other compartment.

One end of the shaft 7 is provided with an upwardly and rearwardly extending arm 9, the horizontal portion 10 of which extends through the upper end of the pivoted link 11, which is pivotally connected at $11^a$ to the floor 2 beneath the counter. It will be seen that when the link 11 is rocked in the direction of the arrow $a$ the arm 9 will be released and a shaft 7 allowed to rotate under the weight of the trap door 5, and the thief standing thereon. To move the lever 11 in the direction of the arrow $a$ a horizontally pivoted lever 12, through the end 13 of which the threaded extension 14 extends and is loosely mounted is provided. When the paying teller is ordered by the thief to hand out the money from the paying teller's compartment, the paying teller places his foot against the arm 15 of the lever 12 and forces the same in the direction of the arrow $b$ which will move the arm 13 in the direction of the arrow $a$ and release the shaft 7 so that it can rotate and consequently release the trap door 5, for dropping the thief into a basement or into a compartment. When it is desired to restore the trap door 5 to normal position after an operation thereof, the operator rotates the drum 16, thereby winding thereon a cable 17, which is connected at 18 to the underside of the free end of the trap door 5, said drum unwinds the cable when the trap door 5 is released.

From the above it will be seen that a trap door is provided by means of which a paying teller or receiving teller may in an attempted hold up spring a trap door in the floor, preferably adjacent the forward side of the counter in a manner whereby the thief will be dropped through an opening in the floor into the basement of the bank or into a special compartment.

The invention having been set forth what is claimed as new and useful is:—

1. The combination with a counter, of a trap door disposed forwardly thereof, said trap door being hingedly mounted and having its forward end extending under the forward end of the counter, a rockable shaft beneath the counter, lugs carried by said rockable shaft and adapted to engage under the free end of the door, the U-shaped link pivoted adjacent the rear side of the shaft, an angular arm carried by the shaft and having one of its portions extending through the link and cooperating with the upper end thereof for preventing rotation of the shaft and lever means for controlling said angular arm and releasing the same.

2. The combination with a counter, of a trap door disposed forwardly thereof, said trap door being hingedly mounted and having its forward end extending under the forward end of the counter, a rockable shaft beneath the counter, lugs carried by said rockable shaft and adapted to engage under the free end of the door, a U-shaped link pivoted adjacent the rear side of the shaft, an angular arm carried by the shaft and having one of its portions extending through the link and cooperating with the upper end thereof for preventing rotation of the shaft, means for controlling said U-shaped link for releasing said angular arm, a cable connected to the under side of the free end of the door and a rotatable drum to which said cable is attached, said drum and cable forming means whereby the door may be moved to closed position and held in closed position during the resetting of the tripping mechanism.

In testimony whereof I have signed my name to this specification in the presence of two subscribing witnesses.

LEWIS BERRY.

Witnesses:
　T. P. Ross,
　A. J. Turman.